No. 757,954.                                      Patented April 19, 1904.

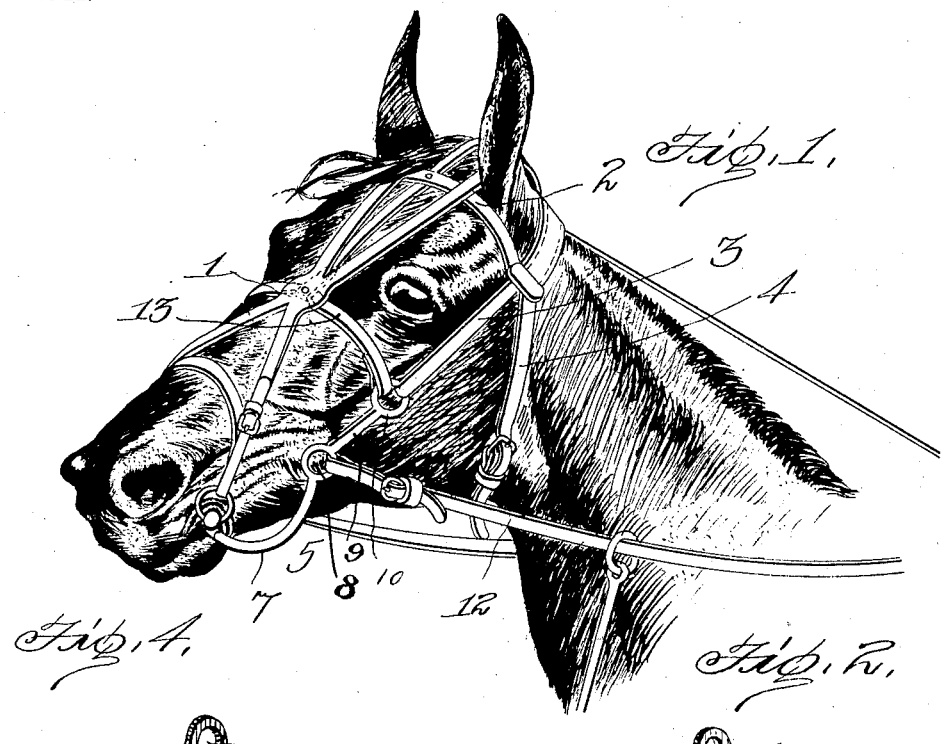
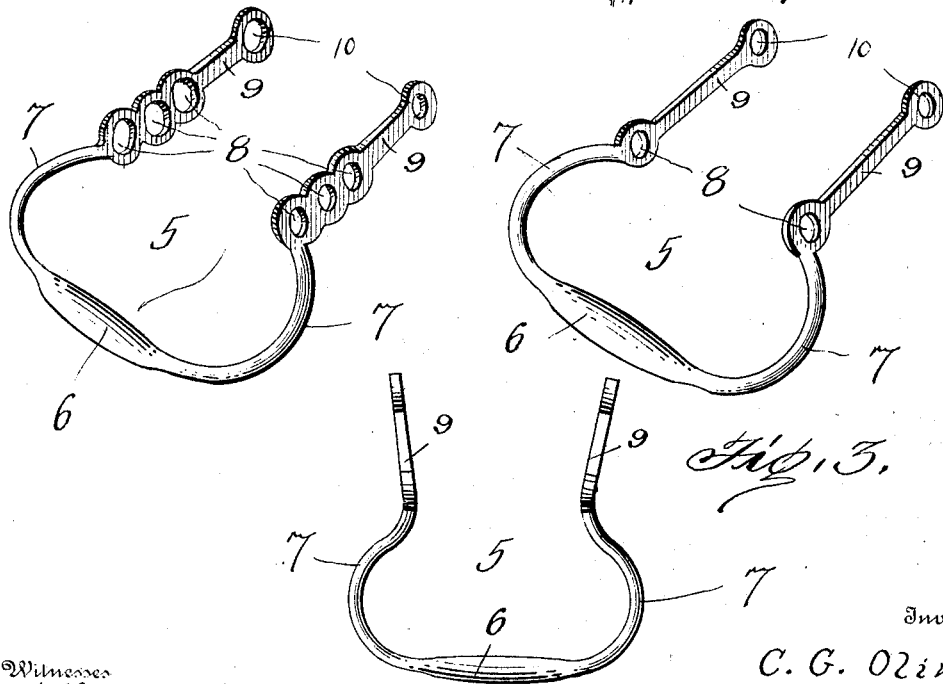

UNITED STATES PATENT OFFICE.

CLARENCE G. OLIN, OF WINDSOR, OHIO.

BRIDLE-BIT.

SPECIFICATION forming part of Letters Patent No. 757,954, dated April 19, 1904.

Application filed April 13, 1903. Serial No. 152,421. (No model.)

*To all whom it may concern:*

Be it known that I, CLARENCE G. OLIN, a citizen of the United States, residing at Windsor, in the county of Ashtabula and State of Ohio, have invented certain new and useful Improvements in Bridle-Bits; and I do declare the following to be a full, clear, and exact description of the invention, such as will enable others skilled in the art to which it appertains to make and use the same.

This invention relates to improvements in bits for bridles.

The object of the invention is to provide a bit in which the pull of the driving-rein will be distributed through the bridle to the head of the animal and not directed entirely upon the mouth, a further object being to provide a bit which will prevent cheek-pressure and which will be of great advantage in driving horses with tender mouths and unable to take a firm hold upon the bit.

With these and other objects in view the invention consists of certain novel features of construction, combination, and arrangement of parts, as will be more fully described, and particularly pointed out in the appended claim.

Figure 1 is a view of the bit, showing the same applied. Fig. 2 is a detail perspective view of the same. Fig. 3 is a plan view, and Fig. 4 is a perspective view, of a modified form of the bit.

In the drawings, 1 denotes the bridle, consisting of the usual head-stall 2, having the cheek-straps 3 and throat-latch 4.

5 denotes the bit, consisting of a mouthpiece or bar 6, the ends of which are extended outwardly and curved upwardly and inwardly, as shown at 7, to the face of the animal, where they are adapted to join rings 8. The extending curved ends of the mouth-pieces prevent the bit from pressing upon the cheeks of the animal. From the rings 8 extend side bars 9, at the upper ends of which are formed rings 10.

In the rings 8 are adapted to be buckled the ends of the driving-reins 12, and to the rings 10 are connected the lower ends of the cheek-straps 3 and the ends of a head band or strap 13, which is arranged across the front of the horse's head or face below the eyes and is adapted to relieve the mouth of the animal from the entire pull of the reins.

In Fig. 4 of the drawings is illustrated a modified form of construction in which is shown three rings 8, whereby the reins may be adjustably connected to the same to permit a greater or less pull to be exerted upon the mouth of the horse, as desired.

The advantage derived from the use of a bit of this character will be readily seen, and, as hereinbefore stated, the pull of the reins is divided and distributed to the head of the animal by the head band or strap 13, so that horses having a tender or "light" mouth may be driven without injury.

From the foregoing description, taken in connection with the accompanying drawings, the construction and operation of the invention will readily be understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

A bridle-bit, comprising a bit-bar, side bars provided with rings at their opposite ends, and side pieces connecting the ends of the bit-bars to the forward ends of the side bar, said side pieces having a pronounced outward swell to clear the cheeks of the animal.

In testimony whereof I have hereunto set my hand in presence of two subscribing witnesses.

CLARENCE G. OLIN.

Witnesses:
E. J. HETERMAN,
GLENN RAWDON.